United States Patent [19]

Cahill

[11] Patent Number: 5,581,387

[45] Date of Patent: Dec. 3, 1996

[54] OPTICAL DATA COMMUNICATIONS NETWORK WITH A PLURALITY OF OPTICAL TRANSMITTERS AND A COMMON OPTICAL RECEIVER CONNECTED VIA A PASSIVE OPTICAL NETWORK

[75] Inventor: Neil Cahill, Ashby De La Zouch, United Kingdom

[73] Assignee: Fujitsu Limited, Kanagawa, Japan

[21] Appl. No.: 580,044

[22] Filed: Dec. 20, 1995

Related U.S. Application Data

[63] Continuation of Ser. No. 285,239, Aug. 3, 1994, abandoned.

[30] Foreign Application Priority Data

Aug. 4, 1993 [GB] United Kingdom ................. 93161701

[51] Int. Cl.⁶ ..................................................... H04J 14/08
[52] U.S. Cl. .......................... 359/137; 359/136; 359/189; 359/168
[58] Field of Search ..................................... 359/135, 136, 359/137, 189, 168

[56] References Cited

U.S. PATENT DOCUMENTS

| | | | |
|---|---|---|---|
| 5,063,595 | 11/1991 | Ballance | 359/137 |
| 5,107,361 | 4/1992 | Kneidinger et al. | 359/137 |
| 5,305,333 | 4/1994 | Kaylor et al. | 372/26 |
| 5,325,225 | 6/1994 | Suzaki et al. | 372/26 |
| 5,353,143 | 10/1994 | Clarke | 359/135 |

FOREIGN PATENT DOCUMENTS

| | | | |
|---|---|---|---|
| 0216214 | 4/1987 | European Pat. Off. . | |
| 0122036 | 7/1984 | Japan | 359/187 |
| 0151039 | 7/1987 | Japan | 359/187 |
| WO8604205 | 7/1986 | WIPO . | |
| WO8805233 | 7/1988 | WIPO . | |
| WO91/06157 | 5/1991 | WIPO . | |

OTHER PUBLICATIONS

English translation of European Patent appln. (UK) No. 0216214, date of translation Aug. 14, 1991.

*Primary Examiner*—Leo Boudreau
*Assistant Examiner*—Bhavesh Mehta

[57] ABSTRACT

An optical data communications network, for example a TPON (telecommunications over passive optical networks) network, has a common optical receiver and a plurality of optical transmitters connected to the common optical receiver by a passive optical network which consists of optical splitters/combiners linked by lengths of an optical fibre. The optical signals produced respectively by the different optical transmitters are interleaved together in a predetermined time-division multiple access format and are modulated using a return-to-zero modulation format. The common optical receiver can operate satisfactorily at desirably-high bit rates despite wide variations in the power levels of the optical signals reaching the receiver from the different transmitters, which variations arise due to the different attenuations experienced by those signals as they propagate along optical fibre paths of different lengths containing different numbers of splitters/combiners. As a result, power levelling of the transmitters is not required.

7 Claims, 5 Drawing Sheets

OPTICAL DATA COMMUNICATIONS NETWORK WITH A PLURALITY OF OPTICAL TRANSMITTERS AND A COMMON OPTICAL RECEIVER CONNECTED VIA A PASSIVE OPTICAL NETWORK

This is a continuation of application Ser. No. 08/285,239, filed Aug. 3, 1994, now abandoned.

BACKGROUND OF THE INVENTION

1. Field of the Invention

The present invention relates to optical data communications networks, in particular but not exclusively to a TPON (telecommunications over passive optical networks) network.

2. Description of the Prior Art

In a TPON network, a network head-end station (for example in a telephone exchange) is linked to plurality of remote terminations (for example street distribution points) by a passive optical splitting network (PON). There may be separate PONs for the downstream (head-end to terminations) and upstream (terminations to head-end) data directions.

In the TPON network, according to a bit transport system (BTS) proposed by British Telecommunications PLC, in the downstream direction data is broadcast by the head-end station to all the terminations in the network in a time division multiple access (TDMA) multiplexed frame. In the upstream direction, each termination transmits a data pulse in a predetermined time slot so that the data pulses reaching the head-end station from the different terminations are interleaved to form an upstream TDMA frame having a predetermined format.

The link loss (optical attenuation), between a termination and the head-end station, may vary considerably from one termination to another in dependence upon the distance of the termination concerned from the head-end station and upon the number of optical splitters through which the optical signal from the termination must pass to reach the head-end station. This means that, assuming all of the terminations transmit their data pulses at the same optical power level, the interleaved upstream data pulses reaching the head-end station will vary significantly from one another in optical power.

Heretofore it has been thought that it would not be possible for the head-end station optical receiver to cope with such wide variations in received optical power levels, and accordingly, in a trial system, the optical output power level of each termination was controlled individually, for example in dependence upon control data included in the downstream TDMA frame broadcast to the terminations by the head-end station, so as to achieve more uniformity in the received optical power levels at the head-end station.

Such individual control of the terminations, however, is undesirable in that it increases the complexity, and hence the cost, of the opto-electronic equipment at each termination. The cost of the terminations is often a critical element in the feasibility of any network. Moreover, the need to transmit control data in the downstream TDMA frame, at least on initialisation of a termination and probably at intervals during use thereof to overcome drift, may result in slow initialisation and can generally reduce the time available for transmission of data.

BRIEF SUMMARY OF THE INVENTION

According to the present invention there is provided an optical data communications network including a common optical receiver and a plurality of optical transmitters connected to the said common optical receiver by way of a passive optical network, wherein optical signals produced respectively by the different optical transmitters are interleaved together in a predetermined time-division multiple access format and are modulated using a return-to-zero modulation format, the said passive optical network and/or the said optical transmitters being such that optical signals received by the common optical receiver from one of the said optical transmitters differ in power from those received by the receiver from another of the said optical transmitters.

In such a network, the use of return-to-zero (RZ) modulation format enables the common optical receiver in the head-end station to cope with wide variations in the power levels of the optical signals reaching the receiver from the different terminations. In the trial system mentioned above, on the other hand, a nonreturn-to-zero (NRZ) modulation format was used, which, as explained hereinafter in more detail, effectively made it impossible for the common optical receiver to cope with the received power level variations in a practical network.

The common optical receiver preferably includes opto-electronic conversion means, arranged for receiving the said optical signals and operative to convert those received optical signals into a corresponding electrical signal having a DC signal component upon which AC data signals, corresponding to the said optical signals, are superposed. Signal processing means are DC-coupled to the opto-electronic conversion means for receiving the electrical signal and are operable to produce an output signal dependent upon the difference between the electrical signal and a predetermined bias signal. In such a receiver, because the opto-electronic conversion means are DC-coupled to the signal processing means, problems of baseline wander due to variations in the received power levels from different transmitters, are overcome.

The opto-electronic conversion means may, for example, be a PINFET receiver, in which case the DC signal component is a DC bias signal arising from biassing arrangements for the PINFET receiver.

The predetermined bias signal, which should be set in dependence upon the DC signal component of the electrical signal, can be fixed but, in a preferred embodiment, the signal processing means are operable, during a quiet phase of the network when no upstream-direction transmitter is producing an optical signal, to store the electrical signal produced at that time, and are operable thereafter to employ that stored signal as the above-mentioned predetermined bias signal. Such an arrangement permits satisfactory operation even if the DC signal component of the electrical signal varies, for example with time and temperature. It also avoids the need for presetting the DC signal component at each termination.

In one such arrangement, the signal processing means include a differential amplifier circuit having a first input connected for receiving the electrical signal produced by the opto-electronic conversion means, and also include a sample-and-hold circuit having a sampling input connected to an output of the differential amplifier circuit and a holding output connected to a second input of the differential amplifier circuit. The sample-and-hold circuit is activated to sample the output signal of the differential amplifier circuit during the quiet phase so that during that phase the sampleand-hold circuit completes a negative feedback loop between the output and the second input of the differential amplifier circuit, whereby the output signal tends to substantially the same value as the said electrical signal at the said first input. The sample-and-hold circuit is then deactivated, at a predetermined instant in the quiet phase, to hold at its holding output the value of the said output signal at that instant so that thereafter the output signal value produced by the differential amplifier circuit is dependent upon the difference between the value of the electrical signal at the first input and the holding output value. Such an arrangement makes effective use of a single differential amplifier circuit and sample-and-hold circuit to achieve the required signal storage and amplification functions.

In the above arrangement, after the quiet phase the input of the differential amplifier is referenced to the holding output value. In view of this, the common optical receiver advantageously includes comparator means connected to the output of the differential amplifier circuit for comparing the output signal value thereof with a threshold value, and also includes threshold value generating means connected to the sample-and-hold circuit for deriving the threshold value from the said holding output value. Thus, the threshold value tracks changes in the holding output value, for example so as to overcome problems that would otherwise be caused by variations in the holding output value due to long term drift of temperature and/or supply voltages etc. over many multiframes.

The common optical receiver preferably further includes mean power detection means arranged for providing a measure of the mean value of the said electrical signal, that measure being employed by the threshold value generating means to increase the said threshold value, relative to the holding output value, if the mean value is relatively high and to decrease the threshold value, relative to the holding output value, if the mean value is relatively low. Such a receiver can operate over a wider range of received optical powers than its inherent (adaptive) power range.

DETAILED DESCRIPTION OF THE PREFERRED EMBODIMENTS

Figure 1A:
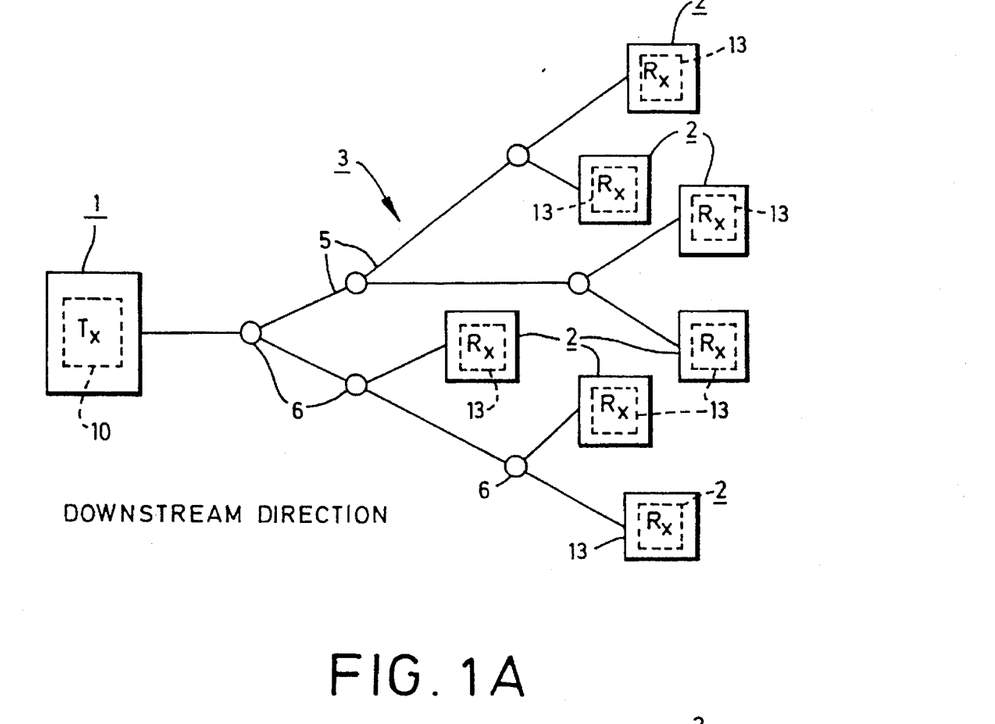
FIG. 1 shows a block diagram of a TPON network.
Figure 1B:
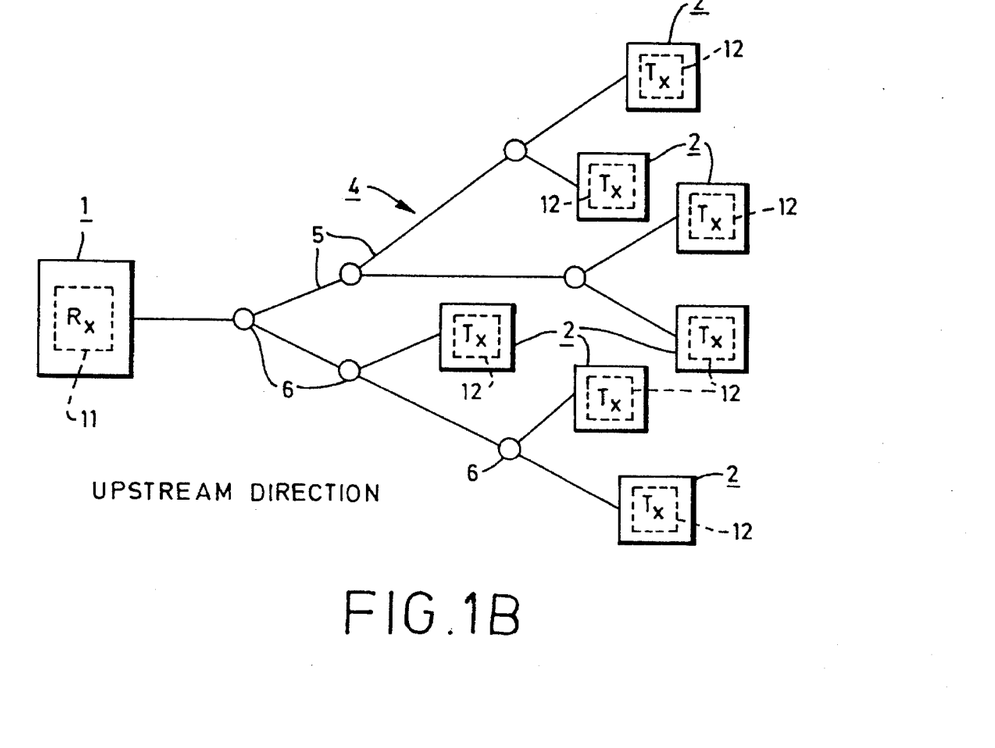

A TPON network, as shown in FIG. 1, includes a network head-end station 1 located at a central site which may, for example, be a telephone exchange. The network also includes a plurality of terminations 2 which may, for example, be located respectively at street distribution points.

In the example shown in FIG. 1, two separate passive optical splitting networks (PON) 3 and 4 are used to link the network head-end station 1 to the terminations 2. The PON 3 is used to convey optical signals in the downstream direction, from the network head-end station 1 to the terminations 2. The PON 4 is used to convey optical signals in the upstream direction, from the terminations 2 to the network head-end station 1.

Each PON 3 or 4 includes lengths of optical fibre 5 and passive optical splitters 6. The maximum distance between a termination 2 and the head-end station 1 is typically less than 10km, but could be up to 20km.

The head-end station 1 includes a common optical transmitter 10 for launching optical signals into the PON 3 for the downstream direction, and a common optical receiver 11 for receiving optical signals from the PON 4 for the upstream direction. Similarly, each termination 2 includes an optical transmitter 12 for launching optical signals into the appropriate branch of the upstream PON 4, and an optical receiver 13 for receiving optical signals from the appropriate branch of the downstream PON 3.

Data is transmitted over the PONs 3 and 4 in accordance with a bit transport system (BTS) proposed by British Telecommunications PLC. In the downstream direction, data is broadcast by the common optical transmitter 10 in the head-end station 1 to all the terminations 2 in the network in a time-division multiple access (TDMA) multiplexed frame (multiframe). Each of the terminations 2 is arranged to be responsive to the broadcast optical signals only in its predetermined time slot(s) within the downstream multiframe.

Figure 2:
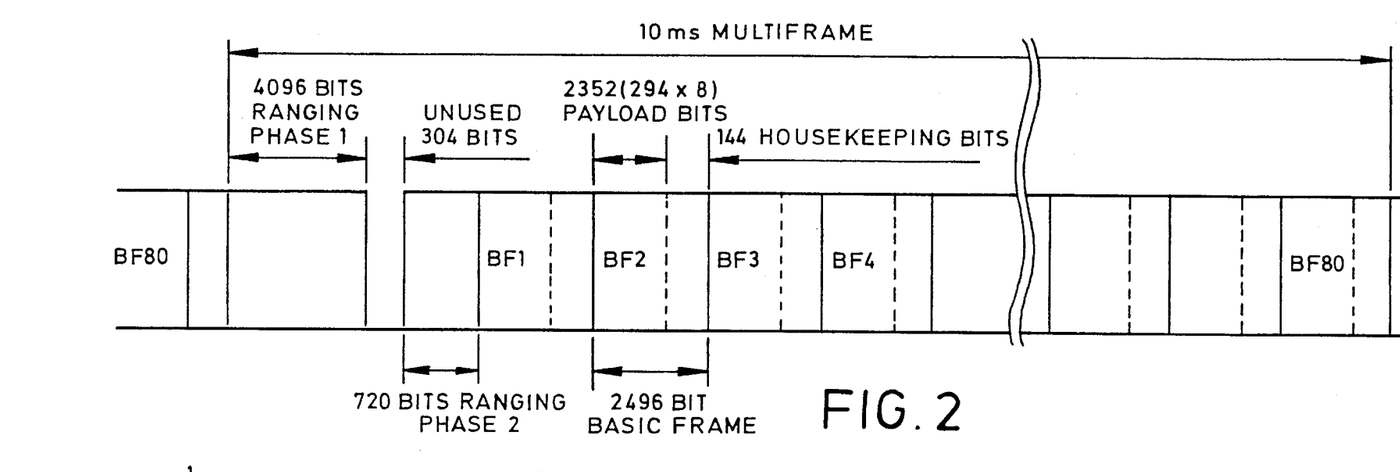
FIG. 2 shows a diagrammatic representation of an upstream TDMA multiframe in the TPON network of FIG. 1.

In the upstream direction, the optical transmitter 12 of each termination 2 transmits optical data pulses in predetermined time slots allocated to the termination concerned so that the optical data pulses reaching the head-end station 1 from the different terminations 2 are interleaved to form an upstream TDMA multiframe having a predetermined format as shown in FIG. 2.

The upstream TDMA multiframe is of duration 10ms and, apart from an initial portion or header used for ranging purposes, consists of bit- or byte-interleaved data from the different terminations 2, organised into a series of basic frames (BF1 to BF80) each consisting of 2496 bits in total, of which 2352 bits are allocated to data (payload bits) and the remaining 144 bits are used for network control purposes (housekeeping bits). The bit rate in the upstream PON is 20.48Mbit/s, so that the bit period is approximately 48.8ns. In order to maximise the data transfer rate, there are no gaps between the interleaved bits or bytes from the different terminations 2, that is to say, at the end of the bit period for one termination (or the end of the byte for one termination in the case of byte interleaving) the next-transmitting termination becomes active immediately in the next bit period.

Figure 3:
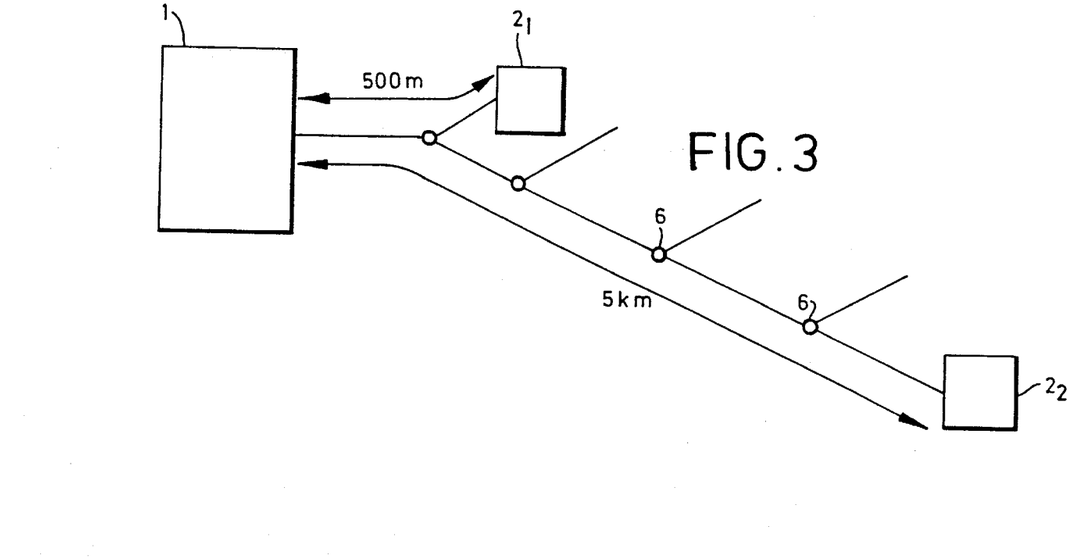
FIG. 3 shows a block diagram of a TPON network having terminations at widely differing distances from a head-end station of the network.

The distances of the terminations 2 from the head-end station 1 in a TPON network can vary significantly from one another. For example, in an extreme case as shown in FIG. 3, the first termination $2_1$ is only 500m from the head-end station 1, and the optical path between the termination $2_1$ and the head-end station 1 involves only one optical splitter 6. On the other hand, the second termination $2_2$ is 5km from the head-end station 1 and the optical path between the termination $2_2$ and the head-end station 1 involves four optical splitters 6. The attenuation in the optical path between the head-end station 1 and the termination $2_2$ is therefore much greater than that between the head-end station 1 and the termination $2_1$. Assuming a 3dB loss in each splitter 6, then even neglecting fibre loss, the attenuation in the path to the head-end station 1 from the termination $2_2$ will be 9dB greater than in the corresponding path from the termination $2_1$.

Assuming that the terminations $2_1$ and $2_2$ are assigned successive time slots in the upstream TDMA multiframe, then unless the transmitting power levels of the optical transmitters 12 in the terminations $2_1$ and $2_2$ are adjusted appropriately, the received optical power at the common optical receiver 11 of the network head-end station 1 will be 9dB or more greater in the time slot $t_1$ for the termination $2_1$ than in the succeeding time slot $t_2$ for termination $2_2$. Such widely disparate power levels in successive bit periods were found to cause problems for the optical receiver in the head-end station, as explained below with reference to FIG. 4A.

Figure 4A:
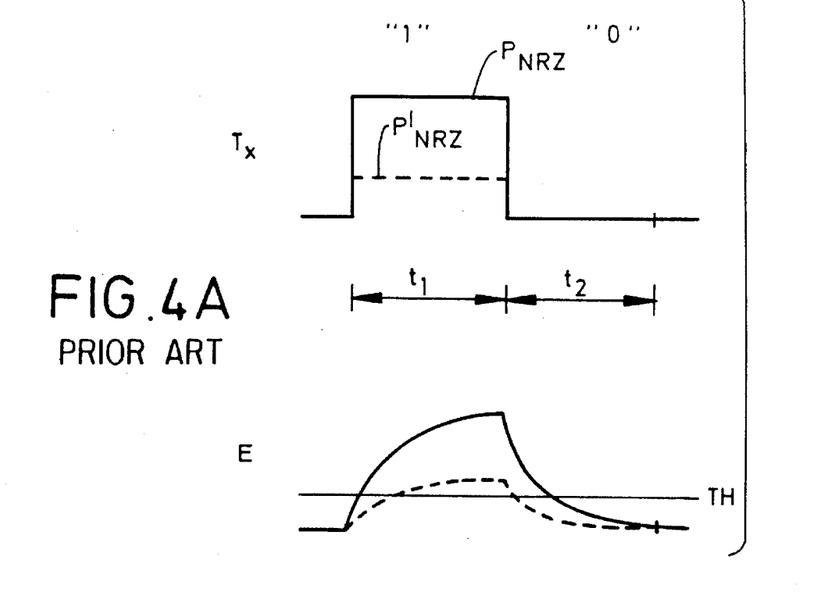
FIG. 4A shows a timing diagram illustrating a modulation format used in a previously-considered TPON network.

In FIG. 4A, the data modulation format employed in a previously-considered TPON network is represented. The format employed is nonreturn-to-zero (NRZ), which requires that a symbol "1" is transmitted as a pulse $P_{NRZ}$ of uniform high light level for the full duration of a time slot (bit period). The interleaved optical pulses are received by the optical receiver in the head-end station and converted, by opto-electronic conversion circuitry, into a corresponding electrical signal E, for example as shown in the lower portion of FIG. 4A. The opto-electronic conversion circuitry response time is such that the transitions in the electrical signal E are subject to some degree of rounding. Thus, as FIG. 4A shows, following a "1" symbol in time slot $t_1$, in the time slot $t_2$ the electrical signal decays relatively slowly towards the zero level.

The response of the opto-electronic conversion circuitry to a pulse $P'_{NRZ}$ of lower power is shown in dotted lines in the lower portion of FIG. 4A. In further circuitry of the receiver, the level of the electrical signal E is compared with a predetermined threshold TH level to distinguish between the "0" and "1" light levels. If power levelling is not performed, the predetermined threshold level TH must be set to a suitably low value bearing in mind that it must be less than the highest value of the electrical signal E for the weakest optical pulse which it is desired to detect, as represented for example by the pulse $P'_{NRZ}$ in dotted lines in FIG. 4A. The slow decay of the electrical signal E means that, if the "1" symbol in time slot $t_1$ is from a strong transmitter (pulse $P_{NRZ}$), a "0" symbol in the next time slot $t_2$ (either from the same transmitter or from another transmitter) may be mistakenly interpreted as a "1" symbol because for at least the initial portion of the time slot $t_2$ the electrical signal E exceeds the threshold value.

To overcome this problem, in a previously-considered TPON network which underwent a trial by British Telecommunications PLC, the solution adopted was to provide for individual adjustment of the optical output powers of the different terminations. By boosting the optical output power of distant terminations relative to those of near terminations, it was possible to compensate for the different path attenuations involved and so ensure that the successive optical pulses received by the head-end station receiver 11 were of sufficiently uniform amplitude. This permits a higher threshold value to be chosen.

By contrast, a TPON network embodying the present invention can avoid the need for individual control of the optical output powers of the terminations, even when the terminations vary in distance from the head-end station receiver by as much as from 50m to 10km, as explained below with reference to FIG. 4B.

Figure 4B:
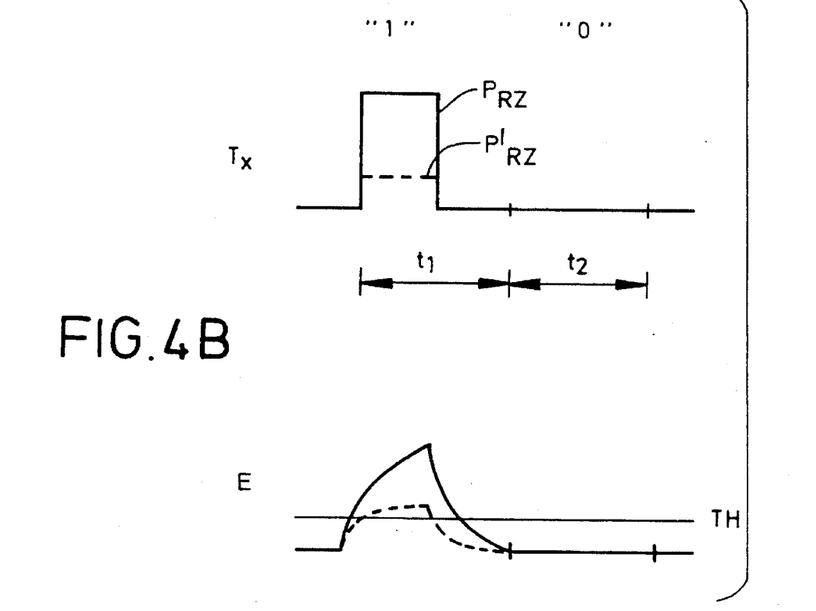
FIG. 4B shows a timing diagram illustrating a modulation format used in a TPON network embodying the present invention.

In a TPON network embodying the present invention, the modulation format used is return-to-zero (RZ), as shown in FIG. 4B. In this modulation format, a symbol "1" is transmitted as a pulse $P_{RZ}$ having a high light level for only an initial part of the time slot (bit period), for example the first half of the time slot, whereafter the low or zero light level is transmitted for the remainder of the time slot. The corresponding electrical signal derived by the opto-electronic conversion circuitry in the head-end station optical receiver is shown in the lower portion of FIG. 4B. At the start of the time slot $t_2$, the electrical signal E produced by the high power pulse $P_{RZ}$ has an amplitude lower than the predetermined threshold level TH (set, as before to permit detection of the weaker pulse $P'_{RZ}$), so that no data error results in time slot $t_2$.

Thus, the use of RZ modulation format can enable the head-end station optical receiver to cope effectively with optical pulses of widely different power levels in adjacent time slots, without requiring complex arrangements for adjusting the individual optical output power levels of the terminations or very fast opto-electronic conversion circuitry in the head-end optical receiver.

Figure 5:
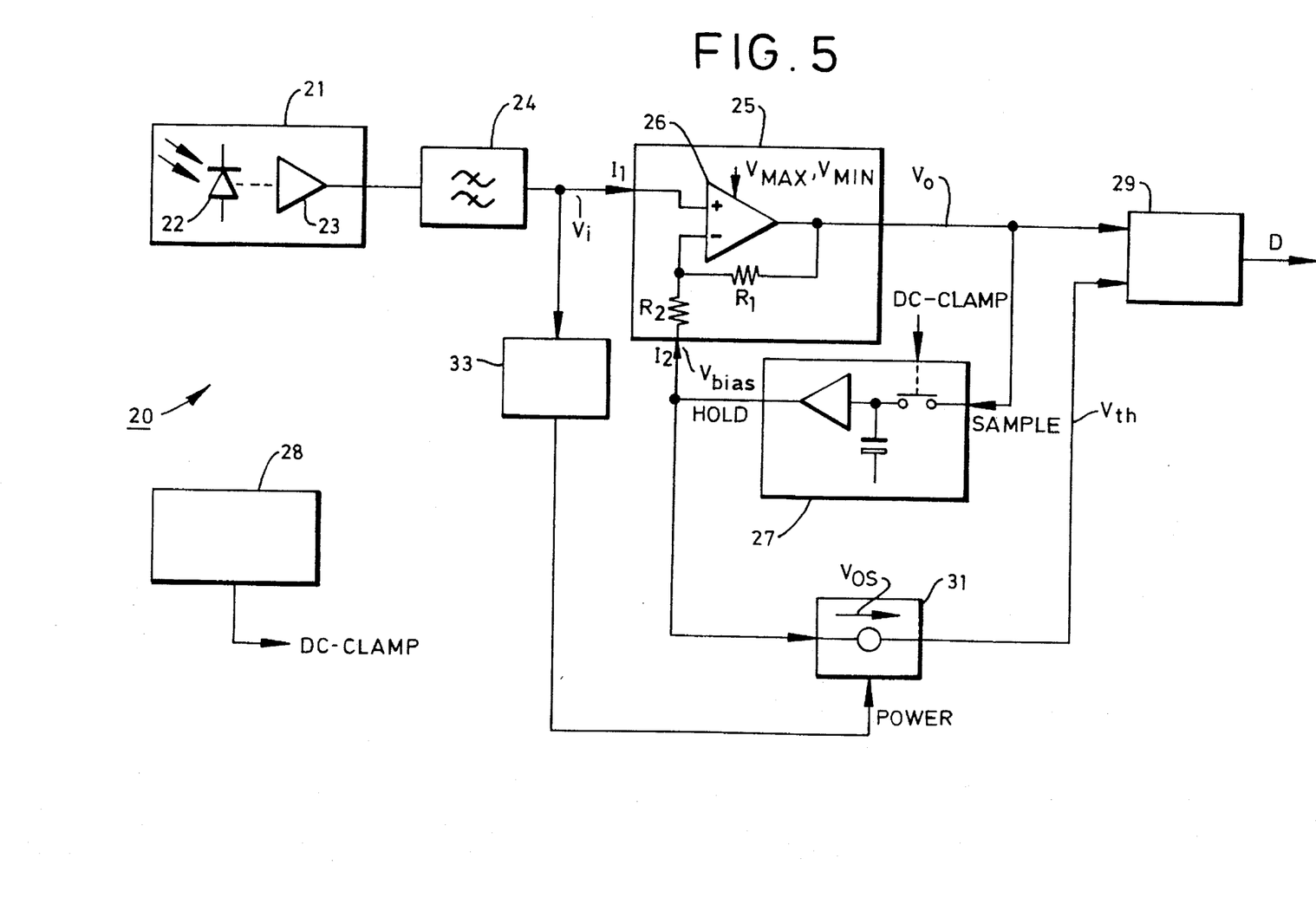
FIG. 5 shows a block diagram of receiving circuitry for use in a TPON network embodying the present invention.

FIG. 5 shows a preferred example of receiving circuitry for use in the common optical receiver 11 of a TPON network embodying the present invention. The receiving circuitry 20 includes an optical receiving circuit comprising a transimpedance 20Mbd PINFET type receiver 21, including a photodiode 22 formed on a common substrate with an FET amplifier 23, having an output voltage of a few millivolts at its sensitivity limit of −48dBm (peak), and a maximum output voltage of around 1 volt at saturation. The bias current for the photodiode is filtered.

The output voltage $V_i$ of the PINFET receiver 21 is filtered by a low pass filter 24.

Due to the design of the FET amplifier in the PINFET receiver 21, the filtered output voltage $V_i$ sits at a DC bias level of −1 to −1.5 volts in the absence of any received optical signal. When optical pulses are received from a termination, these are converted into corresponding AC data pulses which are superimposed on this DC bias component. These AC data pulses must be amplified before application to decision circuitry of the receiver used to regenerate the received data.

Previously-proposed receiving circuitry for use in TPON networks has employed AC-coupling between the PINFET receiver 21 and a subsequent amplifier stage used for performing such amplification, since such coupling serves to prevent the above-mentioned DC bias component of the output voltage of the PINFET receiver 21 from being applied to the input of the amplifier stage. However, in such an AC-coupled receiver subsystem, baseline wander tends to occur unless the received optical pulses in the upstream TDMA multiframe are sufficiently uniform in optical power and occurrence.

To avoid problems associated with baseline wander the receiving circuitry 20 of FIG. 5 provides a completely DC-coupled receiver subsystem, which includes a non-linear gain block 25.

The gain block 25 receives at a first input $I_1$ thereof the filtered output voltage $V_i$ of the PINFET receiver 21, and receives at its second input ($I_2$) a predetermined bias voltage $V_{bias}$ corresponding to the DC component of the output voltage $V_i$. The gain block 25 includes a differential amplifier circuit, constituted by an amplifier element 26 and resistors $R_1$ and $R_2$, whose input is referenced to $V_{bias}$.

Upper and lower predetermined clamping voltages $V_{max}$ and $V_{min}$ are applied to the amplifier 26, for reasons explained hereinafter.

The gain block 25 serves to subtract from the output voltage $V_i$ of the PINFET receiver 21 the predetermined bias voltage $V_{bias}$ and to amplify the difference between the voltages $V_i$ and $V_{bias}$ such that the gain block 25 amplifies the AC data pulses but not the DC bias component in the PINFET receiver output voltage $V_i$.

The predetermined bias voltage $V_{bias}$ may be derived from a fixed voltage source but, as the DC bias component of the PINFET receiver output voltage $V_i$ varies from one receiver to another and also drifts with time and temperature, preferably the bias voltage $V_{bias}$ to be employed by the gain block 25 is established by the circuitry when first turned on and is then adjusted periodically as necessary during operation of the circuitry.

The receiving circuitry 20 therefore further includes a sample-and-hold circuit 27 having a sampling input connected for sampling the output voltage $V_o$ of the gain block 25 and a hold output connected to the second input of the gain block 25. The sample-and-hold circuit 27 is activated to sample the voltage $V_o$ at its sampling input by a control signal DC-CLAMP provided by control circuitry 28 of the optical receiver 11 during an initial portion of each upstream TDMA multiframe, as described below in more detail.

The receiving circuitry 20 further includes a high-speed comparator circuit 29 having a first input connected to receive the output voltage $V_o$ of the gain block 25 and a second input connected to receive a threshold voltage $V_{th}$ provided by a threshold voltage generating circuit 31. The threshold voltage generating circuit 31 is also connected to the hold output of the sample-and-hold circuit 27 for receiving the bias voltage $V_{bias}$. The threshold voltage generating circuit 31 has a further input for receiving a monitoring signal POWER provided by a mean power detection circuit 33. The circuit 33 receives as an input the filtered output voltage $V_i$ of the PINFET receiver 21.

In operation of the receiving circuitry 20 of FIG. 5, the DC-CLAMP control signal is applied by the control circuitry 28 to the sample-and-hold circuit 27 during the quiet phase in the initial portion of each upstream TDMA frame (see FIG. 2). During this quiet phase, no correctly-operating termination is producing optical pulses, and therefore the output voltage $V_i$ of the PINFET receiver contains no AC data pulses and has only its DC bias component which is normally in the range from −1 to −1.5 volts. Whilst the control signal DC-CLAMP is active, the output voltage $V_o$ of the amplifier element 26 in the gain block 25 is fed back, via the sample-and-hold circuit 27, to the second (inverting) input $I_2$ of the gain block 25, so that a negative feedback loop exists between the output and input of the gain block 25. This negative feedback loop eventually causes the bias voltage $V_{bias}$ at the inverting input $I_2$ of the gain block 25 to assume a level close to (for example within 3 millivolts of) that of the PINFET receiver output voltage $V_i$ received during the quiet phase at the first (non-inverting) input $I_2$ of the gain block 25, i.e. $V_{bias}$ becomes substantially equal to the DC bias component of the PINFET receiver output voltage.

Once the quiet phase of each multiframe is over, the control circuitry 28 deactivates the control signal DC-CLAMP, so that the negative feedback loop between the output and input of the gain block 25 is broken, and $V_{bias}$ is stored in the sample-and-hold circuit 27. Thereafter, as mentioned above the gain block 25 operates as a differential amplifier in which the stored bias voltage $V_{bias}$ is subtracted from the output voltage $V_i$ of the PINFET receiver 21 and the difference voltage $(V_i - V_{bias})$ is then amplified.

Incidentally, since the quiet phase in each upstream TDMA frame is quite short (approximately 15 microseconds), when the receiving circuitry 20 is initially turned on it may take a number of multiframes for the correct value of the bias voltage $V_{bias}$ to be stored in the sample-and-hold circuit 27. This, however, is of little practical consequence in view of the fact that, at the time the network is turned on, it normally takes several multiframes for the remaining parts of the network, for example the terminations, to be operating correctly anyway.

The maximum gain of the differential amplifier is set by the ratio of the resistors $R_1$ and $R_2$ as $1+R_1/R_2$, for example the maximum gain may be around 36. This maximum gain cannot be applied to AC data pulses corresponding to the strongest received optical pulses since such data pulses may have an amplitude of 0.5V or more before amplification, sending the output of the amplifier element 26 into saturation.

For this reason, the amplifier element 26 is desirably one having DC clamping to promote fast recovery from saturation by preventing the output voltage $V_o$ from straying outside a range delimited by the predetermined upper and lower clamping voltages $V_{max}$ and $V_{min}$. The upper clamping voltage $V_{max}$ may be, for example, 1 volt above the bias voltage $V_{bias}$ (i.e. $V_{max} = V_{bias} + 1 \approx 0V$) and the lower clamping voltage $V_{min}$ may be −5V. The upper clamping voltage $V_{max}$ limits the effective gain of the differential amplifier to around 1 to 2 for AC data pulses of the maximum amplitude (0.5 to 1V), produced by the PINFET receiver 21 in response to optical pulses from the nearest terminations. Thus, the gain characteristic of the gain block 25 is non-linear and so the block 25 serves to produce amplified AC data pulses of acceptably uniform amplitudes, irrespective of non-uniformity in the received optical powers, and which are within predetermined upper and lower limits.

Furthermore, because the bias voltage $V_{bias}$ tends to be substantially the same as the DC bias component in the output voltage $V_i$ of the PINFET receiver, the output voltage $V_o$ of the gain block 25 contains an acceptably-low DC component even at the maximum gain (x36) thereof.

In the high-speed comparator 29 the output voltage $V_o$ of the gain block 25 is compared with the threshold voltage $V_{th}$ provided by the threshold voltage generating circuit 31. The circuit 31 is coupled to the sample-and-hold circuit 27 and adds to the bias voltage $V_{bias}$ stored in the sample-and-hold circuit 27 a variable offset voltage $V_{os}$ so as to produce a threshold voltage which tracks changes in the bias voltage $V_{bias}$ (i.e. $Vth = V_{bias} + V_{os}$). This is advantageous because, as noted above, the input of the differential amplifier circuit in the gain block 25 is referenced to the bias voltage $V_{bias}$.

The variable offset voltage $V_{os}$ is controlled in dependence upon the monitoring signal POWER provided by the mean power level detection circuit 33. The mean power level detection circuit 33 monitors the mean value of the output voltage $V_i$ of the PINFET receiver 21. The monitoring signal POWER is employed by the threshold voltage generating circuit 27 in such a way as to increase the variable offset voltage $V_{os}$ when the mean value of the output voltage $V_i$ is relatively large and to decrease that offset voltage when the mean value of the output voltage $V_i$ is relatively low.

Figure 6:
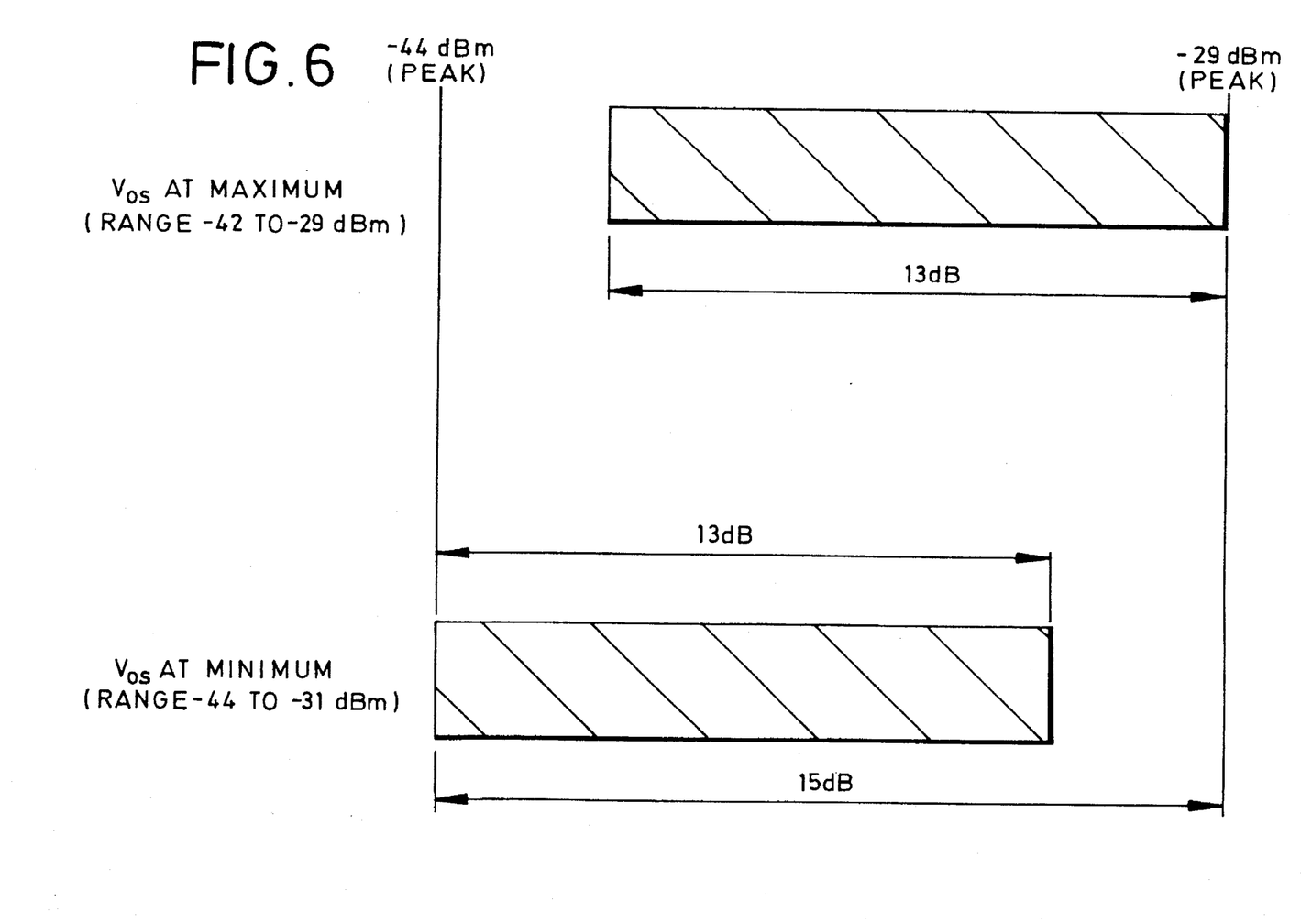
FIG. 6 shows a diagram for illustrating an advantageous feature of the FIG. 5 circuitry.

The ability to vary the offset voltage $V_{os}$, and hence the differential between the bias voltage $V_{bias}$ and the threshold voltage $V_{th}$, can be advantageous in a network in which the inherent dynamic (adaptive) range of the receiving circuitry 20 does not cover the full required dynamic range of the network. For example, the receiving circuitry may have an inherent adaptive range in excess of 13dB, whereas the full required dynamic range of the network may be from −44 to −29dBm, namely a range of 15dB. In this case, the signal POWER provided by the mean power level detection circuit 33 can serve as a weighting factor for adjusting the threshold voltage $V_{th}$ employed by the comparator circuit 29 according to whether the average power from all the individual terminations is toward the higher or lower end of the allowed input power band (−44 to −29dBm). This weighting factor is illustrated in FIG. 6.

Alternatively, however, the offset voltage Vos may be fixed.

The high-speed comparator circuit 29 produces a stream of data pulses D based on the result of the comparison between $V_o$ and $V_{th}$. This data stream D is applied to further circuitry of the optical receiver 11 in the head-end station, which further circuitry separates out the information for each different termination.

It will be understood that, although the foregoing embodiment of the present invention has been described in the context of a TPON network, in other embodiments the present invention is applicable advantageously to any optical network, particularly a TDMA network, in which it is possible for an optical receiver to receive optical pulses that vary in power over a short time scale.

In the example illustrated in FIG. 4B, a symbol "1" was transmitted as a pulse having a high light level for the first half of the bit period. It will be understood that the proportion of the bit period over which the light level is high need not be 50%, however. In particular, it would be possible to decrease the high light level time to less than 50%, although this would be at the expense of the energy being transmitted in each bit period.

What we claim is:

1. An optical data communications network comprising:
   a common optical receiver; and
   a plurality of optical transmitters connected to said common optical receiver by way of a passive optical network;
   wherein optical signals produced respectively by the different optical transmitters are interleaved together in a predetermined time-division multiple access format and are modulated using a return-to-zero modulation format;
   said passive optical network and/or said optical transmitters being such that optical signals received by the common optical receiver from one of said optical transmitters are substantially unequal in power to optical signals received by the common optical receiver from another of said optical transmitters,
   wherein the use of the return-to-zero modulation format permits the common optical receiver to cope with wide variations in the received power levels from different optical transmitters.

2. A network as claimed in claim 1, wherein said common optical receiver includes:
   opto-electronic conversion means arranged for receiving said optical signals and operative to convert those received optical signals into a corresponding electrical signal having a DC signal component upon which AC data signals, corresponding to said optical signals, are superposed; and
   signal processing means DC-coupled to said opto-electronic conversion means for receiving said electrical signal and operable to produce an output signal dependent upon the difference between said electrical signal and a predetermined bias signal.

3. A network as claimed in claim 2, wherein said signal processing means are operable, during a quiet phase of the network when none of said optical transmitters is producing an optical signal, to store said electrical signal produced at that time, and are operable thereafter to employ that stored signal as said predetermined bias signal.

4. A network as claimed in claim 3, wherein said signal processing means include:
   a differential amplifier circuit having a first input connected for receiving said electrical signal produced by the opto-electronic conversion means; and
   a sample-and-hold circuit having a sampling input connected to an output of the differential amplifier circuit and also having a holding output connected to a second input of the differential amplifier circuit;
   said sample-and-hold circuit being activated to sample the output signal of the differential amplifier circuit during said quiet phase so that during that phase the sample-and-hold circuit completes a negative feedback loop between said output and said second input of the differential amplifier circuit, whereby said output signal tends to substantially the same value as said electrical signal at said first input, and being deactivated, at a predetermined instant in the quiet phase, to hold at said holding output the value of said output signal at that instant so that thereafter the output signal value produced by the differential amplifier circuit is dependent upon the difference between the value of the electrical signal at the first input and the holding output value.

5. A network as claimed in claim 4, wherein said common optical receiver further includes:
   comparator means connected to said output of the differential amplifier circuit for comparing said output signal value with a threshold value; and
   threshold value generating means connected to said sample-and-hold circuit for deriving said threshold value from said holding output value.

6. A network as claimed in claim 5, wherein said common optical receiver further includes mean power detection means arranged for providing a measure of the mean value of said electrical signal, said measure being employed by the threshold value generating means to increase said threshold value, relative to said holding output value, when said mean value is relatively high and to decrease that value, relative to said holding output value, when said mean value is relatively low.

7. A network as claimed in claim 1, being a telecommunications-over-passive-optical-networks (TPON) network operating according to a bit transport system (BTS).

* * * * *